United States Patent Office 2,999,102
Patented Sept. 5, 1961

2,999,102
BIS-(STEROID-21)-DICARBOXYLIC ACID ESTERS
Joachim Heider and Dietrich Jerchel, Biberach, Germany, assignors to Dr. Karl Thomae G.m.b.H., Biberach an der Riss, Germany, a corporation of Germany
No Drawing. Filed Sept. 26, 1960, Ser. No. 58,156
Claims priority, application Germany Oct. 14, 1959
14 Claims. (Cl. 260—397.45)

This invention relates to novel bis-(steroid-21) dicarboxylic acid esters which possess a strong anti-inflammatory activity. This invention further relates to a process for the production of the said novel esters.

It is known that the corticosteroids, especially hydrocortisone and its derivatives, exhibit a strong anti-inflammatory activity in addition to their mineralocorticoid and glucocorticoid activity. The 21-acetate esters of these steroids are biologically equivalent to the free alcohol and both are useful in dermatology because of their anti-inflammatory activity.

It is an object of the invention to provide novel bis-(steroid-21)-dicarboxylic acid esters which possess greater anti-inflammatory activity than the free steroid.

It is another object of the invention to provide a process for the production of the novel bis-(steroid-21) dicarboxylic acid esters.

These and other objects and advantages of the invention will become obvious from the following detailed description.

The novel esters of the invention have the formula

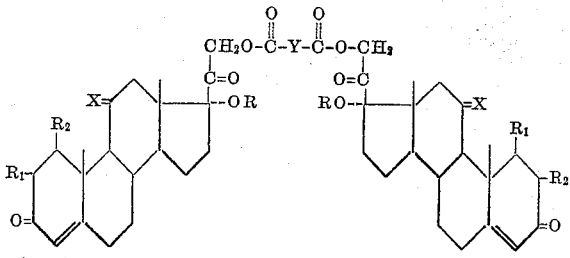

wherein X is oxygen or

R is hydrogen or an acyl radical of an organic carboxylic acid of 1 to 18 carbon atoms, $R_1$ and $R_2$ are hydrogen or when taken together form a double bond, and Y is selected from the group consisting of a carbon-carbon bond, saturated or unsaturated alkylene radicals containing 1 to 6 carbon atoms, cycloalkylene radical, phenylene, substituted phenylene and diphenylene radicals. The two steroid nucleus in the ester may be identical or different from one another.

The compounds of the invention can be prepared by the known methods for preparing esters. The preferred method of producing the instant esters is the reaction of the free 21-ol-steroid with the desired dicarboxylic acid dihalide in the presence of inert solvents at temperatures between −10° C. and 100° C. Suitable inert solvents are pyridine, dioxane and dimethylformamide. Other known methods may be used for preparing the esters, such as heating alkali metal or alkaline earth metal salts of the dicarboxylic acid with the 21-halo-steroid.

To obtain mixed steroid esters of the dicarboxylic acid, a steroid-21-semi-ester of the dicarboxylic acid may be reacted with the 21-halo-steroid. Another method is to react a (steroid-21) (lower alkyl) dicarboxylic acid ester with a 21-ol-steroid.

The alcohol moiety of the di-ester of the invention is a member of the group consisting of cortisone, hydrocortisone, prednisolone, prednisone and the 17α-acyl derivatives thereof. These well known compounds possess anti-inflammatory activity in themselves, but the di-esters of this invention possess a greater anti-phlogistic activity than the free alcohols or the simple acid esters thereof.

The 17α-acyl radical of the compounds of the invention is the acyl radical of an organic carboxylic acid having 1 to 18 carbon atoms. Suitable carboxylic acids are the alkanoic and alkenoic acids, such as acetic acid, trimethyl acetic acid, propionic acid, 4,4-dimethyl pentanoic acid, undecylenic acid; cycloalkyl alkanoic acids such as β-cyclopentyl propionic acid; arylalkanoic acids such as phenyl propionic acid; cycloalkyl acids such as hexahydrobenzoic acid and hexahydro-terephthalic acid; and phenyl carboxylic acids such as benzoic acid or 3,5-dinitrobenzoic acid.

The dicarboxylic acids which are used to form the di-esters are alkanoic and alkenoic dicarboxylic acids having 2 to 8 carbon atoms such as oxalic, succinic, methyl succinic, dimethyl succinic, allyl succinic, glutaric, adipic, pimelic and suberic acids; cycloalkyl dicarboxylic acids such as hexahydrophthalic acid; aryl dicarboxylic acids such as phthalic acid, tetrahydro-terephthalic acid and endomethylene-tetrahydro-terephthalic acid, isophthalic acid, terephthalic acid and diphenic acid.

In the following examples there are described several preferred embodiments to illustrate the invention. However, it should be understood that the invention is not intended to be limited to the specific embodiments. All melting points are determined by the Kofler block method.

EXAMPLE I

*Bis-(hydrocortisone-21)-oxalic acid ester*

1 gm. of hydrocortisone was dissolved in 7 cc. of dioxane in the presence of 1.5 cc. of pyridine, and 0.19 gm. of oxalyl chloride were added to the solution at 0° C. The reaction mixture was stirred for one day in an ice bath and for two days at 25° C., and was then poured over ice. The flocculent precipitate which separated out was recrystallized from ethyl acetate, yielding 0.6 gm. of bis-(hydrocortisone-21)-oxalic acid ester. The melting point of the product was 258° C. and the specific rotation was $[\alpha]_D 25° = +162°$ (dimethylformamide).

*Analysis.*—Calculated: C, 67.92%; H, 7.5%. Found: C, 67.80%; H, 7.9%.

EXAMPLE II

*Bis-(hydrocortisone-21)-succinic acid ester*

After dissolving 1 gm. of hydrocortisone in a mixture of 6 cc. of dioxane, 1.2 cc. of dimethylformamide and 0.5 cc. of pyridine, 0.23 gm. of succinic acid chloride were added dropwise to the solution at −3° C. A discoloration of the reaction solution took place and the solution was maintained for eleven hours at −4° C. and then for one hour at 25° C. After concentrating the reaction solution in vacuo a dark residue remained which was boiled with activated charcoal, then recrystallized from a mixture of methanol and water (10:2) and again recrystallized from ethanol. 0.5 gm. of bis-(hydrocortisone-21)-succinic acid ester having a melting point of 132.5° C. was obtained. The specific rotation was $[\alpha]_D 22° = +100°$ (dimethylformamide).

*Analysis* (calculated on the basis of one molecule of water of crystallization).—Calculated: C, 66.95%; H, 7.82%. Found: C, 66.75%; H, 8.08%.

EXAMPLE III

*Bis-(hydrocortisone-21)-glutaric acid ester*

1 gm. of hydrocortisone was dissolved in a mixture consisting of 1.5 cc. of anhydrous dimethylformamide and 3 cc. of absolute dioxane and the solution was cooled to −6° C. After 0.255 gm. of glutaric acid dichloride had been added, 0.6 cc. of pyridine were added dropwise. After a reaction period of seven hours at −7 to +5° C. and one hour at 25° C., the solvent was distilled off in vacuo and the resulting oil was added dropwise to water, whereby white flakes separated out after standing for a long period of time. Upon recrystallization from a mixture of methanol and water (2:1), 0.835 gm. of bis-(hydrocortisone-21)-glutaric acid ester having a melting point of 160.5° C. and a specific rotation of $[\alpha]_D^{25°} = +200°$ (ethanol) were obtained.

*Analysis* (based on two molecules of water of crystallization).—Calculated: C, 66.0%; H, 8.01%. Found: C, 66.3%; H, 7.96%.

EXAMPLE IV

*Bis-(hydrocortisone-21)-adipic acid ester*

1 gm. of hydrocortisone was dissolved in 10 cc. of anhydrous pyridine, the resulting solution was cooled to 0° C. and 0.255 gm. of adipic acid dichloride were slowly added dropwise. The temperature of the reaction solution was raised to 25° C. by standing at room temperature for 4–5 hours, during which the initial precipitate went into solution again. After pouring the reaction solution into 160 cc. of water, the white precipitate formed thereby was dissolved in acetone, reprecipitated with acetone and then recrystallized from ethyl acetate. A yield of 0.825 gm. of bis-(hydrocortisone-21)-adipic acid ester having a melting point of 227° C. and a specific rotation of $[\alpha]_D^{25°} = +188°$ (ethanol) was obtained.

*Analysis.*—Calculated: C, 69.04%; H, 7.97%. Found: C, 68.90%; H, 8.09%.

EXAMPLE V

*Bis-(hydrocortisone-21)-pimelic acid ester*

1 gm. of hydrocortisone, dissolved in 10 cc. of anhydrous pyridine, and 0.3 gm. of pimelic acid dichloride were admixed at 0° C. and the temperature of the mixture was raised to 25° C. over a period of five hours. Upon adding the reaction solution dropwise to 150 cc. of water, a white precipitate separated out, which was recrystallized from 10% aqueous methanol. 0.97 gm. of bis-(hydrocortisone-21)-pimelic acid ester having a melting point of 177.5° C. and a specific rotation of $[\alpha]_D^{25°} = +234°$ (ethanol) were obtained.

*Analysis.*—Calculated: C, 70.18%; H, 6.98%. Found: C, 69.50%; H, 7.30%.

EXAMPLE VI

*Bis-(hydrocortisone-21)-suberic acid ester*

1 gm. of hydrocortisone dissolved in a mixture consisting of 8 cc. of dimethylformamide and 2.5 cc. of anhydrous pyridine and 0.31 gm. of suberic acid dichloride were admixed at −5° C. and the mixture was stirred, heated slowly to +10° C. over a period of 20 hours and then maintained at 25° C. for an additional 10 hours. After distilling off the solvent in vacuo and treating the residue with water and twice with ether, a white precipitate was formed which was recrystallized from ethanol. 0.345 gm. of bis-(hydrocortisone-21)-suberic acid ester having a melting point of 220° C. and a specific rotation of $[\alpha]_D^{25°} = +100°$ (ethanol) were obtained.

*Analysis.*—Calculated: C, 69.58%; H, 8.18%. Found: C, 69.25%; H, 8.30%.

EXAMPLE VII

*Bis-(hydrocortisone-21)-phthalic acid ester*

1 gm. of hydrocortisone dissolved in 10 cc. of pyridine was reacted with 0.32 gm. of phthalic acid dichloride for 5 hours at 0° C. and then for one hour at 40° C., and the reaction solution was added dropwise to 200 cc. of water. The readily filterable precipitate formed thereby was washed with 2 N hydrochloric acid, with a 2 N sodium bicarbonate solution and then with water. Recrystallization from acetone yielded 0.77 gm. of bis-(hydrocortisone-21)-phthalic acid ester having a melting point of 193–194° C. and a specific rotation of $[\alpha]_D^{25°} = +182°$ (ethanol).

*Analysis.*—Calculated: C, 70.23%; H, 7.31%. Found: C, 70.00%; H, 7.50%.

EXAMPLE VIII

*Bis-(hydrocortisone-21)-isophthalic acid ester*

1 gm. of hydrocortisone was dissolved in 10 cc. of pyridine and 0.3 gm. of isophthalic acid dichloride was slowly added with stirring to the solution at −5° C. The reaction solution was allowed to stand for 4 hours at 0° C. and another 4 hours at 25° C. Thereafter, it was slowly added dropwise to 200 cc. of ice water. The white precipitate formed thereby was recrystallized from acetone. 0.7 gm. of bis-(hydrocortisone-21)-isophthalic acid ester having a melting point of 238.5° and a specific rotation of $[\alpha]_D^{25°} = +151.5°$ (dimethylformamide) were obtained.

*Analysis* (based on one molecule of water of crystallization).—Calculated: C, 67.46%; H, 7.47%. Found: C, 67.40%; H, 7.40%.

EXAMPLE IX

*Bis-(hydrocortisone-21)-terephthalic acid ester*

After dissolving 1 gm. of hydrocortisone in 10 cc. of pyridine, 0.3 gm. of terephthalic acid dichloride were added dropwise to the solution at −5° C. The resulting reaction solution was allowed to stand for 4 hours at 0° C. and another 4 hours at 25° C., and was then added dropwise to 200 cc. of water. The white precipitate formed thereby was recrystallized from ethanol. The 0.35 gm. of bis-(hydrocortisone-21)-terephthalic acid ester thus obtained had a melting point of 203° C. and a specific rotation of $[\alpha]_D^{22°} = +150°$ (dimethylformamide).

*Analysis* (based on one mol of water of crystallization).—Calculated: C, 67.46%; H, 7.47%. Found: C, 67.25%; H, 7.40%.

EXAMPLE X

*Bis-(hydrocortisone-21)-endomethylene-tetrahydrophthalic acid ester*

1 gm. of hydrocortisone was dissolved in a mixture consisting of 10 cc. of dioxane and 1 cc. of pyridine, and then 0.33 gm. of endomethylene-tetrahydrophthalic acid dichloride was added dropwise to the solution at 0° C. A discoloration took place. After stirring the reaction solution for two days at 0° C. and for one day at 25° C., it was added dropwise to ice water. Recrystallization of the precipitate formed thereby from ethanol yielded 0.8 gm. of bis-(hydrocortisone-21)-endomethylene-tetrahydrophthalic acid ester having a melting point of 184° C. and a specific rotation of $[\alpha]_D^{22°} = +69°$ (dimethylformamide).

*Analysis.*—Calculated: C, 70.31%; H, 7.64%. Found: C, 69.8%; H, 7.94%.

EXAMPLE XI

*Bis-(hydrocortisone-21)-tetrahydrophthalic acid ester*

2 gm. of hydrocortisone were dissolved in a mixture consisting of 9 cc. of dioxane, 2.5 cc. of dimethylformamide and 1.7 cc. of pyridine. To this solution 0.6 gm. of tetrahydrophthalic acid dichloride were added, and the resulting mixture was maintained for six hours at 0° C., overnight at room temperature and for another six hours at 40° C. Thereafter, the reaction solution was poured into 120 cc. of a 3% aqueous solution of HCl, whereby a white, flocculent precipitate formed which was washed with an aqueous sodium bicarbonate solution and then with water.

Recrystallization from a mixture of methanol and water (10:1) yielded 0.6 gm. of bis-(hydrocortisone-21)-tetrahydrophthalic acid ester having a melting point of 176.5–179.5° C. and a specific rotation of $[\alpha]_D^{21°} = +144.6°$ (ethanol/dimethylformamide 1:1).

Analysis (based on one mol of water of crystallization).—Calculated: C, 68.38%; H, 7.82%. Found: C, 68.15%; H, 7.98%.

EXAMPLE XII

*Bis-(hydrocortisone-21)-hexahydrophthalic acid ester*

2 gm. of hydrocortisone were dissolved in a mixture consisting of 10 cc. of pyridine, 5 cc. of dioxane and 1.5 cc. of dimethylformamide. To this solution 0.6 gm. of hexahydrophthalic acid dichloride were added dropwise at 0° C. The white precipitate which immediately formed dissolved in the course of half an hour while the solution turned yellow. The reaction was allowed to proceed for 4 hours at 5° C. and for another 6 hours at 50° C. After pouring the reaction solution into 180 cc. of a 4% HCl-acetone solution and subsequent addition of 250 cc. of water at 30° C., a light yellow precipitate was formed. Recrystallization from a large quantity of boiling acetone yielded 1.35 gm. of bis-(hydrocortisone-21)-hexahydrophthalic acid ester having a melting point of 179.5–181.5° C. and a specific rotation of $[\alpha]_D^{21°} = +164°$ (ethanol).

Analysis (based on ½ mol water of crystallization).—Calculated: C, 69.91%; H, 7.75%. Found: C, 69.25%; H, 7.80%.

EXAMPLE XIII

*Bis-(cortisone-21)-phthalic acid ester*

1 gm. of cortisone was dissolved in 10 cc. of pyridine and to this solution 0.28 gm. of phthalic acid dichloride were added at 0° C. The mixture was allowed to stand overnight at room temperature and was then heated at 40° C. for 6 hours. Upon pouring the reddish-yellow reaction solution into 160 cc. of 2% HCl, a slightly colored, flocculent precipitate was obtained which was washed with a 2% sodium bicarbonate solution and then with water. The raw product was boiled with charcoal in a large amount of acetone and was then crystallized out by adding a small amount of water. 0.94 gm. of bis-(cortisone-21)-phthalic acid ester having a melting point of 183–185° C. and a specific rotation of $[\alpha]_D^{21°} = +200.5°$ (ethanol/dimethylformamide 1:1) were obtained.

Analysis (based on one mol water of crystallization).—Calculated: C, 68.93%; H, 7.18%. Found: C, 68.60%; H, 7.68%.

EXAMPLE XIV

*Bis-(cortisone-21)-tetrahydrophthalic acid ester*

1 gm. of cortisone dissolved in a mixture consisting of 7 cc. of dioxane, 1.5 cc. of dimethylformamide and 1.3 cc. of pyridine was admixed with 0.28 gm. of tetrahydrophthalic acid dichloride while cooling with ice. The mixture was allowed to stand for 3–4 hours at 0° C. and then slowly heated and maintained at 50° C. for 4 hours. After pouring the light yellow reaction solution into 80 cc. of 3% HCl, a yellow raw product was formed, which was washed with sodium bicarbonate and water, dissolved in acetone and recrystallized therefrom by addition of a small amount of water. 0.4 gm. of bis-(cortisone-21)-tetrahydrophthalic acid ester having a melting point of 189–191.5° C. and a specific rotation of $[\alpha]_D^{21°} = +166°$ (dimethylformamide/ethanol 1:1) were obtained.

Analysis (based on one mol of water of crystallization).—Calculated: C, 68.93%; H, 7.18%. Found: C, 68.60%; H, 7.68%.

EXAMPLE XV

*Bis-(cortisone-21)-hexahydrophthalic acid ester*

1 gm. of cortisone was dissolved in a mixture consisting of 6 cc. of dioxane, 3 cc. of pyridine and 1 cc. of dimethylformamide and admixed with 0.29 gm. of hexahydrophthalic acid dichloride at 0° C. The resulting mixture was stirred for 3 hours at 5° C. and then for 6½ hours at 45° C. After admixing the reaction solution with 80 cc. of a 4% hydrochloric acid solution in acetone and adding about 70 cc. of water thereto, a white flocculent precipitate formed which was recrystallized from ethanol. 0.77 gm. of bis-(cortisone-21)-hexahydrophthalic acid ester having a melting point of 231–233.5° C. and a specific rotation of $[\alpha]_D^{21°} = +191°$ (dimethylformamide/ethanol 1:1) were obtained.

Analysis.—Calculated: C, 70.07%; H, 7.53%. Found: C, 69.75%; H, 7.75%.

EXAMPLE XVI

*Bis-(prednisolone-21)-hexahydrophthalic acid ester*

1 gm. of prednisolone was dissolved in 6 cc. of pyridine and the resulting solution was admixed at room temperature with 0.23 gm. of hexahydrophthalic acid dichloride. The resulting mixture was then heated for 6 hours at 45° C. After pouring the reaction solution into a mixture consisting of 36 cc. of acetone, 6.1 cc. of concentrated HCl and 6.1 cc. of water, the solution was admixed with a large amount of water, whereby a grayish white precipitate separated out. After recrystallization from ethanol, 0.53 gm. of bis-(prednisolone-21)-hexahydrophthalic acid ester having a melting point of 251° C. and a specific rotation of $[\alpha]_D^{21°} = +124°$ (dimethylformamide/ethanol 1:1) were obtained.

Analysis.—Calculated: C, 70.07%; H, 7.53%. Found: C, 70.10%; H, 8.10%.

EXAMPLE XVII

*Bis-(prednisolone-21)-phthalic acid ester*

1 gm. of prednisolone was dissolved in 6 cc. of pyridine and the resulting solution was admixed with a solution of 0.22 cc. of phthalic acid dichloride in 1 cc. of dioxane at room temperature. The resulting mixture was then heated for 5 hours at 45° C. The reaction solution was subsequently poured into a mixture consisting of 36 cc. of acetone, 6.1 cc. of concentrated hydrochloric acid and 6.1 cc. of water. The ester reaction product was precipitated from this solution by adding more water dropwise thereto. The white precipitate, formed thereby, was recrystallized from ethanol. 0.64 gm. of bis-(prednisolone-21)-phthalic acid ester having a melting point of 215° C. and a specific rotation of $[\alpha]_D^{21°} = +147.5°$ (dimethylformamide/ethanol 1:1) were obtained.

Analysis (based on 1 mol of water of crystallization).—Calculated: C, 69.10%; H, 6.96%. Found: C, 69.10%; H, 6.92%.

EXAMPLE XVIII

*Bis-(cortisone-17α-acetate-21)-phthalic acid ester*

850 mgm. of bis-(cortisone-21)-phthalic acid ester were admixed at 30° C. with 200 mgm. of p-toluene sulfonic acid, 6 cc. of acetic acid anhydride and 5 cc. of glacial acetic acid. After allowing the resulting mixture to stand for one hour at room temperature and then for three hours at 40° C., all of the material had gone into solution while the solution became light brown. After adding 70 cc. of acetone to the reaction solution and neutralizing the acid solution with 10 to 12 gm. of sodium bicarbonate until the pH was 6, ice was added. A brown precipitate formed which, after recrystallization from ethanol, had a melting point of 202.5° C. 0.64 gm. of bis-(cortisone-17α-acetate-21)-phthalic acid ester with a specific rotation of $[\alpha]_D^{21°} = +44°$ (dimethylformamide/ethanol 1:1) were obtained.

EXAMPLE XIX

*Bis-(prednisolone-21)-tetrahydrophthalic acid ester*

A solution of 0.3 cc. of tetrahydrophthalic acid dichloride in 0.5 cc. of dioxane was added dropwise to a solution of 1 gm. of prednisolone in 6 cc. of pyridine. The resulting mixture was heated for 5 hours at 45° C. and was then poured into a mixture consisting of 18 cc. of acetone, 7 cc. of concentrated HCl and 7 cc. of water. The yellowish raw product precipitated thereby was recrystallized from ethanol/water (1:3) and yielded 0.75 gm. of bis-(prednisolone-21)-tetrahydrophthalic acid ester having a melting point of 205° C. and a specific rotation of $[\alpha]^{D22°}=+92°$ (ethanol).

*Analysis* (based on one mol of water of crystallization).—Calculated: C, 68.79%; H, 7.39%. Found: C, 68.90%; H, 7.59%.

EXAMPLE XX

Bis-(hydrocortisone-21)-diphenic acid ester

A solution of 0.4 gm. of diphenic acid dichloride in 4 cc. of dioxane was added dropwise to a solution of 1 gm. of hydrocortisone in 10 cc. of pyridine, and the resulting mixture was maintained for 15 hours at 50° C. After pouring the reaction solution into a mixture consisting of six times its amount of acetone and a calculated amount of concentrated hydrochloric acid, the raw reaction product was precipitated therefrom by addition of water until turbidity set in. After recrystallizing the raw product twice from acetone and boiling it with activated charcoal, 0.9 gm. of bis-(hydrocortisone-21)-diphenic acid ester having a melting point of 145° C. and a specific rotation of $[\alpha]^{D22°}=+118°$ (ethanol) were obtained.

*Analysis* (based on one mol of water of crystallization).—Calculated: C, 70.83%; H, 6.90%. Found: C, 70.80%; H, 6.62%.

EXAMPLE XXI

Bis-(prednisone-21)-hexahydrophthalic acid ester

A solution of 1 gm. of prednisone in 6 cc. of pyridine was admixed with a solution of 0.23 cc. of hexahydrophthalic acid dichloride in 0.5 cc. of dioxane. The resulting mixture was maintained for 30 hours at 45° C. The raw product was obtained in the form of a brown precipitate by pouring the reaction solution into a mixture consisting of 36 cc. of acetone, 7 cc. of concentrated HCl and 7 cc. of water. After recrystallizing the raw product several times from ethanol, 0.6 gm. of bis-(prednisone-21)-hexahydrophthalic acid ester having a melting point of 214° C. and a specific rotation of $[\alpha]^{D22°}=+110°$ (ethanol) were obtained.

*Analysis* (based on one mol of water of crystallization).—Calculated: C, 68.94%; H, 7.18%. Found: C, 69.15%; H, 7.36%.

Bis-(hydrocortisone-21)-d-camphoric acid ester having a melting point of 143° to 148° C. and a specific rotation of $[\alpha]^{D22°}=+120°$ (ethanol) was prepared by the same method.

EXAMPLE XXII

Bis-(hydrocortisone-21)-phthalic acid ester

A solution of 100 mgm. of 21-iodo-hydrocortisone in 15 cc. of pyridine was admixed with 40 mgm. of di-silver-phthalate and the mixture was maintained for 5 hours at 50° C. accompanied by stirring. While thoroughly cooling the reaction soltion, 18.5 cc. of 36% hydrochloric acid were added for neutralization and the reaction product was precipitated by addition of water. Recrystallization from ethanol/water yielded 28 mgm. (31% of theory) of bis-(hydrocortisone-21)-phthalic acid ester having a melting point of 187° C.

Mixed melting point determination and thin layer chromatograph determination confirmed the identity with the compound produced according to Example VII.

EXAMPLE XXIII

(Hydrocortisone-21)-(cortisone-21)-phthalic acid ester

A suspension of 0.283 gm. of the silver salt of cortisone-21-phthalic acid semi-ester in 10 cc. of acetone and 3 cc. of pyridine was admixed with a solution of 0.22 gm. of 21-iodo-hydrocortisone in 2 cc. of acetone, and the resulting mixture was refluxed for 6 hours. The yellowish brown reaction solution was acidified with 5 cc. of 75% sulfuric acid and was then poured into 150 cc. of water. The light-brown precipitate formed thereby was treated with concentrated hot sodium thiosulfate solution in order to remove the silver iodide included in the precipitate. Washing with water and recrystallizing from ethyl acetate yielded 0.187 gm. of (hydrocortisone-21)-(cortisone-21)-phthalic acid ester having a melting point of 173 to 174° C. and a specific rotation of $[\alpha]^{D22°}=+184°$ (ethanol-dimethylformamide 1:1).

EXAMPLE XXIV

Bis-(prednisolone-21)-adipic acid ester

A solution of 1 gm. of prednisolone in 3 cc. of pyridine was admixed while stirring with a solution of 0.28 gm. of adipic acid dichloride in dioxane, and the resulting solution was maintained for 5 hours at 45° C. After pouring the colorless reaction solution into a mixture consisting of acetone, water and concentrated HCl, two phases were formed from which the ester was crystallized by addition of a small amount of water. By treatment with a sodium bicarbonate solution, water, 2 N hydrochloric acid and again water, the reaction product was obtained in pure form. If necessary, it may be recrystallized from ethanol. A yield of 0.5 gm. of bis-(prednisolone-21)-adipic acid ester having a melting point of 234° C. and a specific rotation of $[\alpha]^{D20°}=+168°$ (in dimethylformamide: acetone=1:1) was obtained.

EXAMPLE XXV

Bis-(prednisolone-21)-terephthalic acid ester 1 gm. of prednisolone was reacted with 0.31 gm. of terephthalic acid dichloride and recrystallized out in a manner analogous to that described in Example XXIV for the preparation of bis-(prednisolone-21)-adipic acid ester. After the purification with sodium bicarbonate, hydrochloric acid and water and recrystallization if necessary, as described in the preceding example, 0.45 gm. of bis-(prednisolone-21)-terephthalic acid ester having a melting point of 219° C. and a specific rotation of $[\alpha]^{D20°}=+39°$ (in dimethylformamide) were obtained.

COMPARATIVE TESTS

The new esters of the invention possess valuable pharmaceutical properties. They are especially distinguished by a strong antiphlogistic activity which far exceeds that of the steroid alcohols upon which the esters are based. To demonstrate the external antiphlogistic effectiveness various testing methods were used, particularly the acanthosis test, the nicotinic acid ester test and the histamine test. The acanthosis test was performed on guinea pigs, and the two last-mentioned tests on human test subjects.

I. *Acanthosis test*

Test subjects: guinea pigs
Number per series: 6–8
Test location: flanks
Number of areas per animal: 6, including 1 untreated control area and 1 area treated only with ointment base.

TEST PROCEDURE

Depilation (chemical), after 24 hours first treatment, then once daily for 10 days continued treatment of test areas; on the 11th day excision of skin areas.

EVALUATION

Per animal and test area, measurement of 50 epidermis thicknesses, i.e. per preparation and series 300–400 individual measurements.

CALCULATION

Determination of acanthosis by the ointment base, with reference to the control (=100) and calculation of the difference between this value and the values obtained from the area treated with steroid and ointment base. (Within any one series the test areas for the individual preparations were changed from one animal to the other).

II. *Nicotinic acid ester test*

Test subjects: Healthy humans.
Number per series: 12
Location of test areas: Underarm—body side
Number of test areas per test subject: 6, including 1 treated only with ointment base and another with a steroid ointment which remained the same.

TEST PROCEDURE

Constant amounts of ointment are rubbed on the test areas under identical conditions. After 3 hours three measurements of the skin color with a reflection photometer at 490 μm. Thereafter, application of 0.1 cc. of a 0.25% nicotinic acid-butoxy-ethylester solution in 96% ethyl alcohol per test area. Measurement of the erythema reaction after 4, 10, 15, 20, 30, 40, 50 and 60 minutes.

CALCULATION

Determination of decrease of reflection by the skin after treatment with nicotinic acid ester in comparison with normal color of skin. Calculation of the median value from the measurements between 5 and 60 minutes and selection of the erythema-maximum, based on the ointment values which were set equal to 100. The median values per series are made up of 96, the maximum values of 12 and the measurements of the normal skin color of 216 individual values.

(In this test, as well as in the subsequent test, the test areas for the individual preparations were changed from one test subject to the other).

III. *Histamine test*

Test subjects: Healthy humans
Number per series: 8
Location of test areas: Underarm—body side
Number of test areas per subject: 4, including 1 treated only with ointment base.

TEST PROCEDURE

Constant amounts of ointment are rubbed into the test areas under identical conditions. After 3 hours, 3 measurements of the skin color with a reflection photometer at 490 μm. Application of 0.1 cc. of a histamine solution 1:1000 dropwise on filter paper (diameter 2.5 cm.). Application of filter paper to test area and iontophoresis for 1 mm. at 0.1 mA D.C. Measurement of erythema reaction after 1, 3, 5, 10, 15, 20, 30 and 40 minutes. Only those reactions can be evaluated which produce erythema without wheals or blisters.

CALCULATION

Same as in nicotinic acid ester test.

The median values per series are composed of 64, the maximum values of 8 and the measurements of the normal skin color of 128 individual measurements.

In the following tables the inhibitive values calculated in the manner described above are given in terms of percent inhibition as well as in comparison with the inhibitive values of hydrocortisone (=1).

Table 1

[Effect of various steroid esters (1% in vaseline) by the acanthosis test]

| Compound | Inhibition in percent | In relation to hydrocortisone (free alcohol)=1.0 |
|---|---|---|
| Hydrocortisone (free alcohol) | 37 | 1.0 |
| Hydrocortisone-21-acetate | 33 | 0.89 |
| Hydrocortisone-21-salicylate | 33 | 0.89 |
| Bis-(hydrocortisone-21)-adipic acid ester | 54 | 1.47 |
| Bis-(hydrocortisone-21)-phthalic acid ester | 57 | 1.54 |
| Bis-(hydrocortisone-21)-glutaric acid ester | 62 | 1.68 |

Table 2

[Effect of various steroid esters (1% in vaseline) by the nicotinic acid ester test]

| Compound | Absolute Value | | Value in relation to free alcohol=1.0 | |
|---|---|---|---|---|
| | Median | Maximum | Median | Maximum |
| Hydrocortisone (free alcohol) | +17 | +17 | 1.0 | 1.0 |
| Hydrocortisone-21-benzoate | +22 | +16 | 0.96 | 1.0 |
| Bis-(hydrocortisone-21)-phthalic acid ester | −21 | −23 | 1.48 | 1.52 |
| Bis-(hydrocortisone-21)-glutaric acid ester | +11 | −19 | 1.05 | 1.44 |
| Bis-(hydrocortisone-21)-pimelic acid ester | +4 | −28 | 1.12 | 1.62 |
| Bis-(hydrocortisone-21)-suberic acid ester | +4 | −15 | 1.12 | 1.38 |
| Bis-(hydrocortisone-21)-oxalic acid ester | −11 | −17 | 1.31 | 1.43 |
| Bis-(hydrocortisone-21)-adipic acid ester | −10 | −3 | 1.30 | 1.20 |

Table 3

[Effect of various steroid esters (1% in vaseline) by the histamine test]

| Compound | Absolute Value | | Value in relation to free alcohol=1.0 | |
|---|---|---|---|---|
| | Median | Maximum | Median | Maximum |
| Hydrocortisone (free alcohol) | +4 | −13 | 1.0 | 1.0 |
| Hydrocortisone-21-acetate | +33 | +28 | 0.78 | 0.68 |
| Hydrocortisone-21-salicylate | +12 | +3 | 0.93 | 0.84 |
| Bis-(hydrocortisone-21)-adipic acid ester | −10 | −4 | 1.16 | 0.91 |
| Bis-(hydrocortisone-21)-phthalic acid ester | −5 | −4 | 1.10 | 0.91 |

All three of the tables clearly show that the bis-hydrocortisone esters of dicarboxylic acids according to the invention are considerably superior to the free alcohol and its esters with monocarboxylic acids with respect to their anti-phlogistic activity.

The corresponding bis-prednisolone-21-esters also exhibit an activity upon external application which is substantially superior to prednisolone as illustrated by the following tables. The dosage must here, as with prednisolone, always be lower than the dosage of hydrocortisone.

Table 4

[Effect of a bis-(prednisolone-21)-ester (0.25%) in vaseline in comparison to prednisolone (0.25%) in vaseline and hydrocortisone (1%) in vaseline by the nicotinic acid ester test]

| Compound | Absolute Value | | Value in relation to hydrocortisone (free alcohol)=1.0 | |
|---|---|---|---|---|
| | Median | Maximum | Median | Maximum |
| Hydrocortisone (free alcohol) | +19 | +10 | 1.0 | 1.0 |
| Prednisolone (free alcohol) | +14 | +4 | 1.04 | 1.26 |
| Bis-(prednisolone-21)-phthalic acid ester | +37 | −37 | 1.89 | 1.75 |

Table 5

[Effect of a bis-(prednisolone-21)-ester (0.25%) in vaseline in comparison to prednisolone (0.25%) in vaseline and hydrocortisone (1%) in vaseline by the histamine test]

| Compound | Absolute Value | | Value in relation to hydrocortisone (free alcohol)=1.0 | |
|---|---|---|---|---|
| | Median | Maximum | Median | Maximum |
| Hydrocrotisone (free alcohol) | +1 | +12 | 1.0 | 1.0 |
| Prednisolone (free alcohol) | +13 | +12 | 0.89 | 1.0 |
| Bis-(prednisolone-21)-phthalic acid | −19 | −7 | 1.25 | 1.25 |

The bis-(hydrocortisone-21)-phthalic acid ester has also been found to be effective in clinical tests for the treatment of inflammatory skin diseases, such as seborrheic, endogenous and common eczemas, contact eczemas and dermatitides. In this connection the rapid onset of the effect, in comparison with known anti-inflammatory steroids, in the treatment of acute disease conditions of the skin was particularly valuable. Moreover, the compounds according to the present invention may be employed as exchange steroids in cases of cortico-fatigue caused by the customary cortisone derivatives.

Various modifications of the process and the products of the present invention may be made without departing from the spirit or scope thereof, and it is to be understood that the invention is limited only as defined in the appended claims.

We claim:

1. Bis-(steroid-21)-dicarboxylic acid esters having the formula

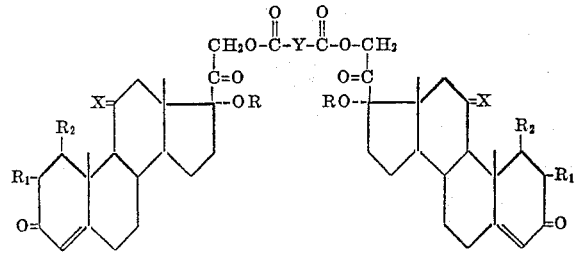

wherein X is selected from the group consisting of oxygen and

$R_1$ and $R_2$ are hydrogen and taken together form a double bond, R is selected from the group consisting of hydrogen and an acyl radical of an organic carboxylic acid having 1 to 18 carbon atoms and Y is selected from the group consisting of a carbon-carbon bond, saturated and unsaturated alkylene radicals having 1 to 6 carbon atoms, cycloalkylene radicals, phenylene radicals, lower alkyl phenylene radicals and diphenylene radicals.

2. Bis-(steroid-21)-dicarboxylic acid esters having the formula

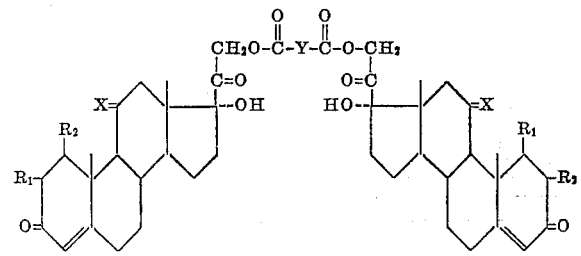

wherein X is selected from the group consisting of oxygen and

$R_1$ and $R_2$ are hydrogen and taken together form a double bond, and Y is selected from the group consisting of a carbon-carbon double bond, a saturated alkylene radical having 1 to 6 carbon atoms, methyl-phenylene, phenylene, diphenylene, tetrahydrophenylene and hexahydrophenylene radicals.

3. Bis-(steroid-21)-dicarboxylic acid esters having the formula

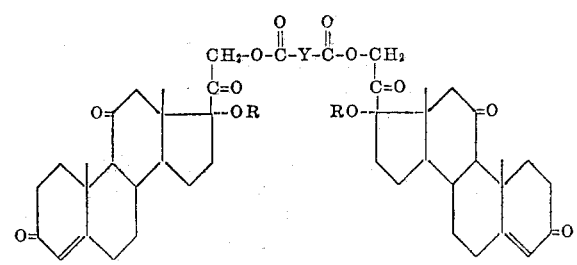

wherein Y is selected from the group consisting of a carbon-carbon bond, saturated and unsaturated alkylene radicals having 1 to 6 carbon atoms, cycloalkylene radicals, phenylene radicals, lower alkyl phenylene radicals and diphenylene radicals, and R is selected from the group consisting of hydrogen and the acetyl radical.

4. Bis-(steroid-21)-dicarboxylic acid esters having the formula

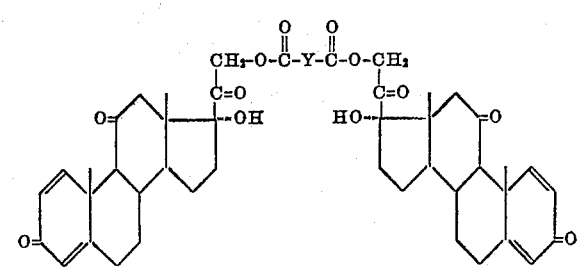

wherein Y is selected from the group consisting of a carbon-carbon bond, saturated and unsaturated alkylene radicals having 1 to 6 carbon atoms, cycloalkylene radicals, phenylene radicals, lower alkyl phenylene radicals and diphenylene radicals.

5. Bis-(steroid-21)-dicarboxylic acid esters having the formula

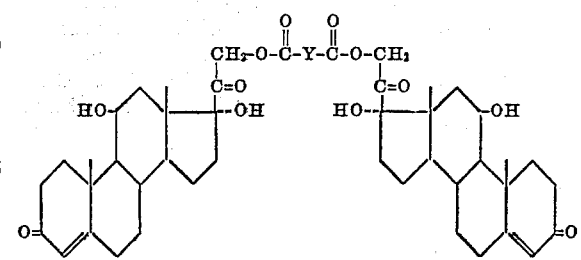

wherein Y is selected from the group consisting of a carbon-carbon bond, saturated and unsaturated alkylene radicals having 1 to 6 carbon atoms, cycloalkylene radicals, phenylene radicals, lower alkyl phenylene radicals and diphenylene radicals.

6. Bis-(steroid-21)-dicarboxylic acid esters having the formula

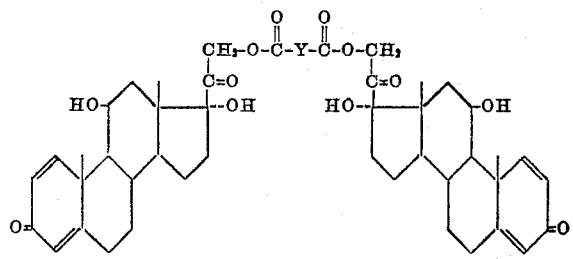

wherein Y is selected from the group consisting of a carbon-carbon bond, saturated and unsaturated alkylene radicals having 1 to 6 carbon atoms, cycloalkylene radicals, phenylene radicals, lower alkyl phenylene radicals and diphenylene radicals.

7. Bis-(hydrocortisone-21)-phthalic acid ester.
8. Bis-(hydrocortisone-21) - endomethylene-tetrahydrophthalic acid ester.
9. Bis-(hydrocortisone-21)-succinic acid ester.
10. Bis-(hydrocortisone-21)-glutaric acid ester.
11. Bis-(hydrocortisone-21)-adipic acid ester.
12. Bis-(prednisolone-21)-phthalic acid ester.
13. Bis - (prednisolone - 21) - hexahydrophthalic acid ester.
14. Bis-(prednisolone-21)-adipic acid ester.

References Cited in the file of this patent

UNITED STATES PATENTS 2,873,271     Korman  ---------------- Feb. 10, 1959